United States Patent
Scoones et al.

(10) Patent No.: US 7,362,083 B2
(45) Date of Patent: Apr. 22, 2008

(54) DC-DC CONVERTER WITH MODULATOR CIRCUIT HAVING A FEED FORWARD STRUCTURE

(75) Inventors: Kevin Scoones, Munich (DE); Joerg Kirchner, Mauern (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 11/278,982

(22) Filed: Apr. 7, 2006

(65) Prior Publication Data
US 2007/0085523 A1  Apr. 19, 2007

(30) Foreign Application Priority Data
Apr. 7, 2005  (DE)  ..................... 10 2005 015 992

(51) Int. Cl.
G05F 5/00 (2006.01)
G05F 1/40 (2006.01)
(52) U.S. Cl. ................ 323/299; 323/303; 323/284; 323/286
(58) Field of Classification Search ........... 323/299, 323/303, 301, 282, 284, 286
See application file for complete search history.

(56) References Cited
U.S. PATENT DOCUMENTS
4,415,960 A * 11/1983 Clark, Jr. ................. 363/21.17
4,580,090 A * 4/1986 Bailey et al. .............. 323/303

* cited by examiner

Primary Examiner—Bao Q. Vu
(74) Attorney, Agent, or Firm—Warren L. Franz; Wade J. Brady, III; Frederick J. Telecky, Jr.

(57) ABSTRACT

A DC-DC converter with an inductor connected in series with a power transistor between first and second terminals of a DC supply source, and with a modulator circuit that has a control output connected to a control gate of the power transistor. The modulator circuit provides a periodic pulse signal the duty cycle of which determines an output voltage at an output terminal of the converter. The modulator circuit comprises an oscillator that determines the frequency of the periodic pulse signal. The modulator circuit also comprises a feedforward structure that determines an approximated duty cycle for the pulse signal based on the value of the input voltage, the sensed output voltage and the amount of current flow in the inductor. An error amplifier in the modulator has a first input connected to a reference voltage source, a second input connected to the output terminal of the converter and an output that supplies a corrective signal used by the modulator to adjust the duty cycle of the pulse signal. Thus, a multiple path feedforward topology is proposed which delivers to the modulator information on input voltage, output voltage and switch current. The feedforward concept is complemented by a low gain error amplifier which compares the output voltage to the reference voltage, which is preferably internal.

10 Claims, 2 Drawing Sheets

DC-DC CONVERTER WITH MODULATOR CIRCUIT HAVING A FEED FORWARD STRUCTURE

The invention relates to a DC-DC converter comprising an inductor connected in series with a power transistor between first and second terminals of a DC supply source, and a modulator circuit with a control output connected to a control gate of the power transistor. In such a converter, the modulator circuit provides a periodic pulse signal the duty cycle of which determines the output voltage at the output terminal of the converter.

BACKGROUND

In a typical switching converter with feedforward compensation, the amplitude of a saw-tooth ramp signal in a pulse width modulator is varied in proportion to the supply voltage. Converters with feedforward compensation have good stability but low accuracy. To increase accuracy, an error amplifier is added which compares the output voltage with a reference voltage and provides a corrective signal. For a high accuracy, the analog control loop must have a high gain, with potential problems of stability. External compensation components may be required to ensure stability.

For applications in portable devices, switching converters should be small and cheap. Integrated CMOS circuits respond to both demands, but a requirement for external compensation components would compromise the inherent benefits of that technology.

SUMMARY

The invention provides a DC-DC converter that allows a high switching frequency to be used with low impedance switches, good accuracy and no external compensation components.

In described embodiments, a DC-DC converter is implemented with an inductor connected in series with a power transistor between first and second terminals of a DC supply source, and with a modulator circuit that has a control output connected to a control gate of the power transistor. The modulator circuit provides a periodic pulse signal, the duty cycle of which determines an output voltage at an output terminal of the converter. The modulator circuit comprises an oscillator that determines the frequency of the periodic pulse signal. The modulator circuit also comprises a feedforward structure that determines an approximated duty cycle for the pulse signal based on the value of the input voltage, the sensed output voltage and the amount of current flow in the inductor. An error amplifier in the modulator has a first input connected to a reference voltage source, a second input connected to the output terminal of the converter and an output that supplies a corrective signal used by the modulator to adjust the duty cycle of the pulse signal. Thus, a multiple path feedforward topology is proposed which delivers to the modulator information on input voltage, output voltage and switch current. The feedforward concept is complemented by a low gain error amplifier which compares the output voltage to the reference voltage, which is preferably internal.

With an implementation in CMOS technology, having a high switching frequency and no requirement for external compensation, small and cheap converters are made available. They have a fast response due to the feedforward paths.

Operation at a fixed switching frequency gives known frequency of switching noise and also allows synchronizing to external clock signals.

In a preferred embodiment, the modulator includes a current generator which generates a core current proportional to the output voltage and a plurality of current mirrors copying the core current at predetermined amplification ratios. A first copy of the core current is used by the oscillator to determine the frequency of the pulse signal. A second copy of the core signal is used by the feedforward structure to determine the duty cycle of the pulse signal. A third copy of the core signal is used by the error amplifier to determine the corrective signal. In this embodiment, three distinct feedforward paths are provided, one of which is used by the error amplifier. In fact, the error amplifier is preferably a transconductance amplifier the output of which is added to the copy of the core signal being used by the feedforward structure to determine the duty cycle of the pulse signal, and the feedforward structure includes a timer circuit with a capacitor that is periodically charged to the input voltage and is discharged by the combined copy of the core current and output of the transconductance amplifier.

As mentioned before, the error amplifier should have a low gain to avoid stability problems, thus eliminating the need for external compensation. The low gain, e.g., 20 dB, is still sufficient for a fast transient response. But due to the low gain, the duty cycle generated by the modulator may not be quite accurate enough. In a preferred embodiment, a first comparator is provided to detect a positive deviation of the output voltage from a target value and a second comparator is provided to detect a negative deviation of the output voltage from the target value. The first and second comparators each have an output connected to an input of a logic circuit within the modulator. The logic circuit has a control output applied to the current generator to slightly modify the current used by the feedforward structure to determine the duty cycle of the pulse signal. This not only improves accuracy, but eventually provides a digital self-calibration of the converter's output signal. Accordingly, a low gain, analog loop is combined with a high gain, digital self-calibration.

BRIEF DESCRIPTION OF THE DRAWINGS

Further features and advantages of the invention will be apparent from the following description of preferred embodiments, with reference to the appended drawings, wherein.

DETAILED DESCRIPTION

Figure 1:
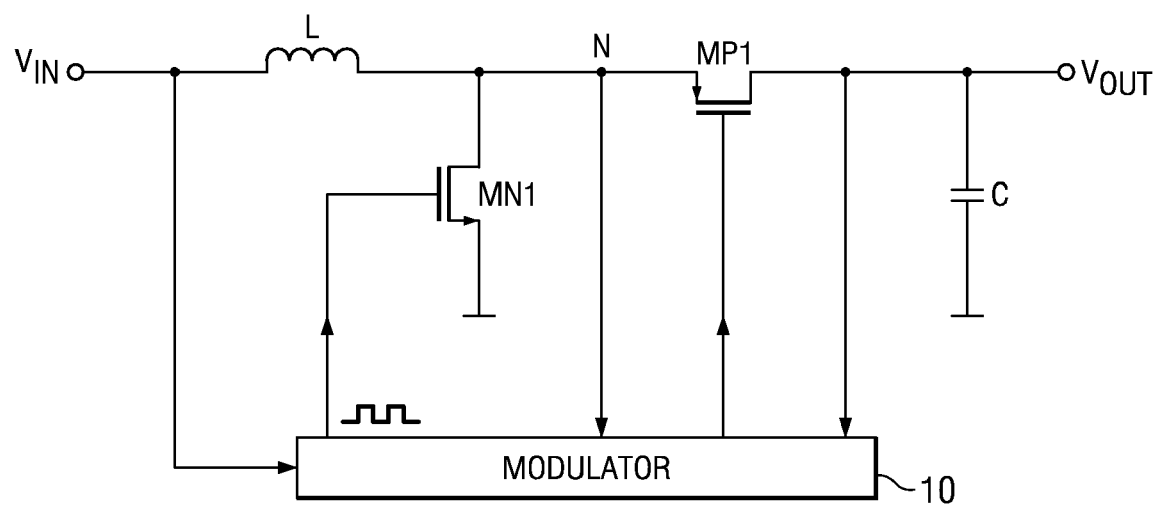
FIG. 1 is a generic block diagram of an integrated DC-DC switching converter in CMOS technology in accordance with the principles of the invention.

With reference to FIG. 1, an inductor L is connected in series with a power NMOS transistor MN1 between input terminal $V_{IN}$ and ground. The node N between inductor L and transistor MN1 is connected to an output terminal $V_{OUT}$ through a power PMOS transistor MP1. The output voltage at terminal $V_{OUT}$ is buffered by a capacitor C. A modulator 10 generates a pulse width modulated (PWM) control signal applied to the gate of transistor MN1. Modulator 10 also supplies a control signal applied to the gate of transistor MP1. Generally, the timing of the control signal applied to transistor MP1 is opposite to that applied to transistor MN1, so that transistor MP1 is ON when transistor MN1 is OFF, and vice versa.

Inputs to modulator 10 are the input voltage at $V_{IN}$, the voltage at node N and the output voltage at $V_{OUT}$. Modulator 10 samples the voltage at node N during the ON times of transistor MN1. Divided by the known ON resistance of transistor MN1, the sampled voltage is representative of the current that flows in inductor L.

It should be understood that, for the illustrated layout, power transistors MN1 and MP1 are included with modulator 10 in an integrated CMOS circuit, and only inductor L and capacitor C are external components.

Figure 2:
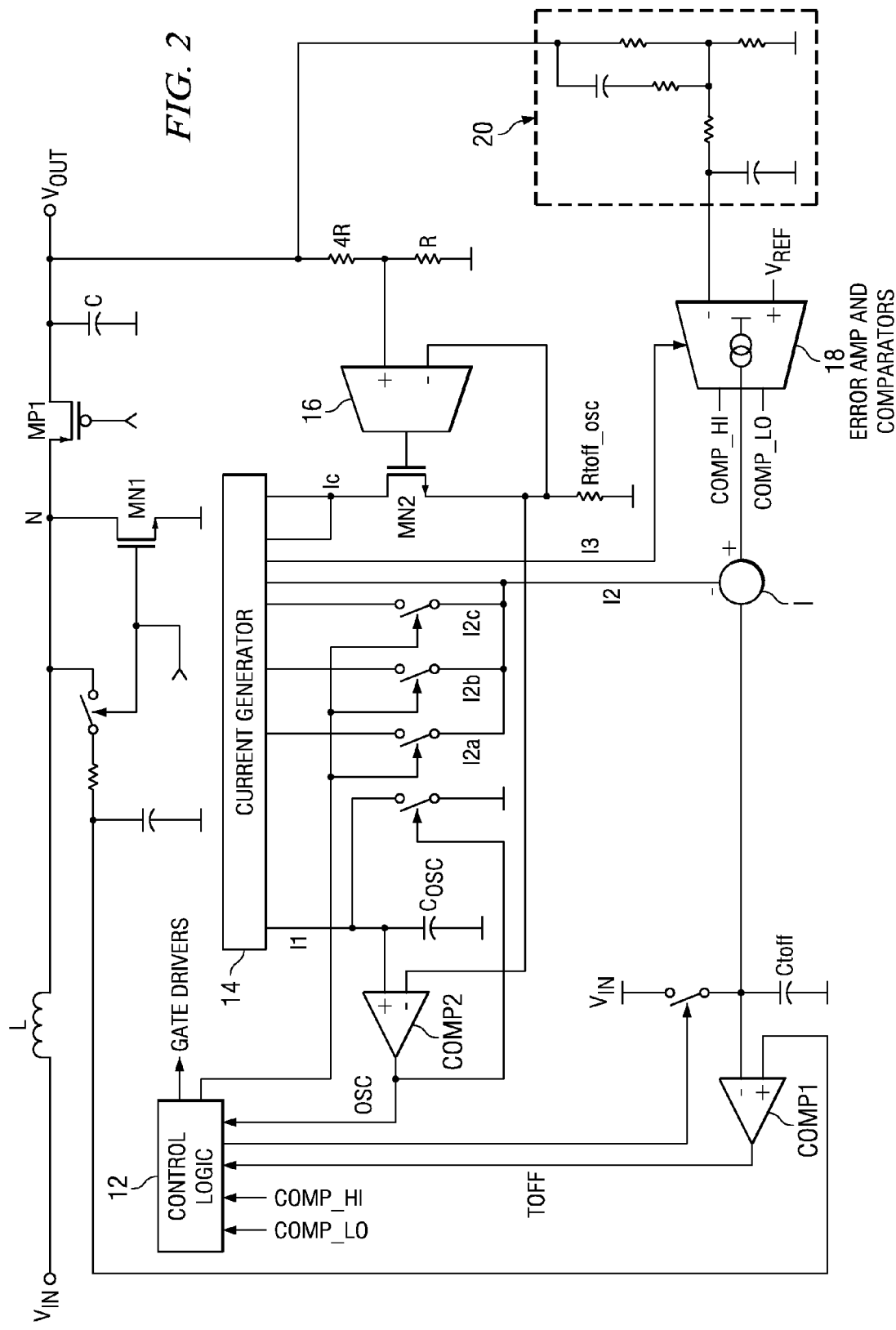
FIG. 2 is a block diagram of a pulse width modulator of FIG. 1.

In the diagram of FIG. 2, it is seen that the voltage at node N is sampled with the frequency and duty cycle of the control signal applied to transistor MN1. The samples are smoothed by an RC combination and applied to the non-inverting input of a comparator COMP1. The inverting input of comparator COMP1 is connected to a grounded capacitor Ctoff which is periodically charged to input voltage $V_{IN}$ and discharged by a current adder I that provides a discharge path. The output TOFF of comparator COMP1 is applied to an input of a control logic 12, which has an output connected to gate drivers (not shown) for power transistors MN1 and MP1. The output TOFF of comparator COMP1 determines the OFF time of transistor MN1.

The period of the pulse modulated control signal is determined by an oscillator implemented with a comparator COMP2. Comparator COMP2 has an inverting input connected to a reference node R and a non-inverting input connected to a grounded capacitor Cosc and to a current output I1 from a current generator 14. A switch controlled by the output OSC of comparator COMP2 periodically discharges capacitor Cosc to ground. The output OSC of comparator COMP2 is also connected to an input of control logic 12.

Current generator 14 generates a core current Ic by means of an internal current source. Core current Ic is fed through an NMOS transistor MN2 and a grounded tail resistor Rtoff_osc, the node between resistor Rtoff_osc and transistor MN2 being reference node R mentioned above. The gate of transistor MN2 is controlled by the output of an error amplifier 16, the inverting input of which is connected to node R and the non-inverting input of which is connected to the tap of a resistive voltage divider with resistors 4R and R that divides the output voltage $V_{OUT}$. Internally of current generator 14, the core current Ic is copied to current output I1 at an appropriate ratio. Another copy 12 goes to current adder I, mentioned above. A third copy 13 goes to a supply input of a transconductance error amplifier 18, the output of which is also fed to current adder I.

Error amplifier 18 has an inverting input connected to terminal $V_{OUT}$ through an RC combination 20 and a non-inverting input connected to a reference voltage source VREF. Reference voltage source VREF can be internal, one of a plurality of different internal sources, or external.

Incorporated within error amplifier 18 are two comparators which share the input stages of the transconductance amplifier and act as extra output stages. The outputs COMP_HI and COMP_LO are also fed as inputs to the control logic 12. These incorporated comparators have thresholds set at a predetermined small deviation from the reference voltage VREF, e.g., 1.6%. Within control logic 12, the outputs COMP_HI and COMP_LO increment or decrement an up/down counter according to which output is active. This counter determines a value N by which the core current Ic is multiplied to be fed from the current generator 14 to current adder I. As is illustrated in FIG. 2, currents 12a, 12b and 12c supplied by current generator 14, all copied from core current Ic, are selectively added to current I2 fed to current adder I, as determined by an output of control logic 12. By changing the factor N used in current generator 14 to adjust the discharge current fed to current adder I, as combined with the output current from error amplifier 18, the counter within control logic 12 implements a digital self-calibration of the converter's output voltage at $V_{OUT}$.

In the schematic block diagram of FIG. 2, all components directly relevant to the control algorithm are shown as implemented for a boost converter. Current limit, over temperature shutdown, anti-ringing switch, UVLO (Under Voltage Lockout), start-up circuitry, etc., are left out for clarity. The control algorithm can equally well be used for buck or buck-boost configurations.

In operation, input voltage, output voltage and inductor current information are passed to the modulator, which generates a duty cycle extremely close to that which is actually required. For a boost converter, this means generating the OFF time of the power NMOS transistor MN1. If this could be done perfectly, zero load regulation and zero line regulation would result, even without an error amplifier.

Since the modulator 10 predicts something very close to the correct duty cycle automatically, the error amplifier 18 can be implemented such that the loop gain remains relatively low. The error amplifier 18 is also designed to give the complete loop a low frequency gain independent of input and output voltage, thus easing compensation over the wide range of input and output voltages. The low gain (20 dB is set in the example) is still sufficient for a fast transient response. Due to the low gain, it is possible that the modulator duty cycle is not quite accurate enough. To remedy this, the two comparators are integrated within the error amplifier 18, which detect when the output voltage is outside of a +/−1.6% window. When this occurs for a certain time (viz., 16 oscillator periods), the digital counter within control logic 12 is incremented or decremented. The output of this counter is used to adjust the current used by the modulator 10 to set the duty cycle.

In the block diagram, the current generator block 14 is used to generate a core current proportional to the output voltage. This core current is copied to several other blocks. The error amplifier 18 receives a copy to enable a well-defined Gm to be established and at the same time generate the offsets for the two comparators, which share the differential input pair of the error amplifier 18. The TOFF TIMER block including the comparator COMP1 also receives a multiple of the core current used to discharge Ctoff and determine the OFF time of the power NMOS transistor MN1. The last copy goes to the oscillator with comparator COMP1, which also receives the fraction of the output voltage used to generate the core current as its reference voltage. Hence the oscillator period remains constant and equal to T=Cosc·Rtoff, irrespective of what output voltage is programmed.

It is beneficial for the oscillator period and TOFF TIMER one shot duration to match as well as possible, as the error amplifier can then concentrate on improving the converter response to line and load transients. This is promoted by using a common resistor, Rtoff_osc, for the two functions, leaving only the capacitors to be matched, which is not too hard.

The TOFF TIMER has a reference voltage equal to the average current through the inductor L times the ON resistance of transistor MN1. The reference voltage is created, simply by sampling the drain voltage of the transistor when it is fully ON. After each OFF-time, the capacitor Ctoff is charged back up to $V_{IN}$, thus the OFF-time is equal to $$Toff = Ctoff \cdot \text{Rtoff\_osc} \cdot \frac{Vin - Il \cdot Rsw}{N \cdot Vout} \qquad 5$$

where N is the multiple of the core current sent from the current generator 14 to the TOFF TIMER. When divided by the oscillator period, this produces exactly the duty cycle required, taking into account line variations and losses due to power transistor impedance. Hence the error amplifier is freed up for other tasks.

The two comparators integrated in error amplifier 18 are simply extra output stages from the main transconductance amplifier. This improves the tracking of the comparators, both amongst themselves and with the actual error amplifier. In the example, the comparator thresholds are set at +/−1.6% of the reference voltage to give the outputs COMP_HI and COMP_LO, respectively. These thresholds can be set reasonably accurately since the offset is based on the same current used to set the Gm of the input stage.

COMP_HI and COMP_LO are fed to the control logic 12, which can increment or decrement the internal up/down counter according to which input is active. This counter determines the value of N in the current generator 14, thus implementing a digital self-calibration of the converter's output voltage.

Those skilled in the art to which the invention relates will appreciate that various additions, deletions, substitutions, and other modifications may be made to the foregoing embodiments, without departing from the scope of the claimed invention.

The invention claimed is:

1. A DC-DC converter, comprising:
   an inductor connected in series with a power transistor between first and second terminals of a DC supply source; and
   a modulator circuit with a control output connected to a control gate of the power transistor; the modulator circuit providing a periodic pulse signal, the duty cycle of which determines an output voltage at an output terminal of the converter;
   wherein the modulator circuit comprises:
      an oscillator that determines the frequency of the periodic pulse signal;
      a feedforward structure that determines an approximated duty cycle for the pulse signal based on the value of the input voltage, the sensed output voltage and the amount of current flow in the inductor; and
      an error amplifier with a first input connected to a reference voltage source, a second input connected to the output terminal of the converter and an output that supplies a corrective signal used by the modulator to adjust the duty cycle of the pulse signal.

2. A DC-DC converter, comprising:
   an inductor connected in series with a power transistor between first and second terminals of a DC source; and
   a modulator circuit with a control output connected to a control gate of the power transistor; the modulator circuit providing a periodic pulse signal, the duty cycle of which determines an output voltage at an output terminal of the converter;
   wherein the modulator circuit comprises:
      an oscillator that determines the frequency of the periodic pulse signal;
      a feedforward structure that determines an approximated duty cycle for the pulse signal based on the value of the input voltage, the sensed output voltage and the amount of current flow in the inductor;
      an error amplifier with a first input connected to a reference voltage source, a second input connected to the output terminal of the converter and an output that supplies a corrective signal used by the modulator to adjust the duty cycle of the pulse signal
      a current generator which generates a core current proportional to the output voltage; and
      a plurality of current mirrors for copying the core current at predetermined amplification ratios; a first copy of the core current being used by the oscillator to determine the frequency of the pulse signal; a second copy of the core signal being used by the feedforward structure to determine the duty cycle of the pulse signal; and a third copy of the core signal being used by the error amplifier to determine the corrective signal.

3. The DC-DC converter of claim 2, wherein the error amplifier is a transconductance amplifier, the output of which is added to the copy of the core signal being used by the feedforward structure to determine the duty cycle of the pulse signal.

4. The DC-DC converter of claim 3, wherein the feedforward structure includes a timer circuit with a capacitor that is periodically charged to the input voltage and is discharged by the combined copy of the core current and output of the transconductance amplifier.

5. The DC-DC converter according to any of claims 2 to 4, wherein the modulator comprises a differential amplifier with a first input receiving a fraction of the output voltage, a second input receiving a feedback signal and an output controlling the current generator to control said core current, the feedback signal being derived as a voltage drop across a resistor in the path of the core current.

6. The DC-DC converter of claim 5, wherein the oscillator has a reference input receiving a reference voltage which is derived as a voltage drop across the same resistor in the path of the core current.

7. The DC-DC converter according to claim 2, wherein the error amplifier has a low gain, and a first comparator is provided to detect a positive deviation of the output voltage from a target value and a second comparator is provided to detect a negative deviation of the output voltage from the target value, the first and second comparators each having an output connected to an input of a logic circuit within the modulator, and the logic circuit having a control output applied to the current generator to slightly modify the current used by the feedforward structure to determine the duty cycle of the pulse signal.

8. The DC-DC converter of claim 7, wherein the first and second comparator are both integrated in the error amplifier and share a differential input transistor pair of the error amplifier.

9. A DC-DC converter, comprising:
   an inductor connected in series with a power transistor between first and second terminals of a DC supply source; and
   a modulator circuit with a control output connected to a control gate of the power transistor; the modulator circuit providing a periodic pulse signal, the duty cycle of which determines an output voltage at an output terminal of the converter;
   wherein the modulator circuit comprises:
      an oscillator that determines the frequency of the periodic pulse signal;

a feedforward structure that determines an approximated duty cycle for the pulse signal based on the value of the input voltage, the sensed output voltage and the amount of current flow in the inductor; and an error amplifier with a first input connected to a reference voltage source, a second input connected to the output terminal of the converter and an output that supplies a corrective signal used by the modulator to adjust the duty cycle of the pulse signal;

wherein the inductor current is detected by sampling the voltage at the connection node between the inductor and the power transistor.

10. A DC-DC converter, comprising:

an inductor connected in series with a power transistor between first and second terminals of a DC supply source; and a modulator circuit with a control output connected to a control gate of the power transistor; the modulator circuit providing a periodic pulse signal, the duty cycle of which determines an output voltage at an output terminal of the converter;

wherein the modulator circuit comprises:

an oscillator that determines the frequency of the periodic pulse signal;

a feedforward structure that determines an approximated duty cycle for the pulse signal based on the value of the input voltage, the sensed output voltage and the amount of current flow in the inductor; and an error amplifier with a first input connected to a reference voltage source, a second input connected to the output terminal of the converter and an output that supplies a corrective signal used by the modulator to adjust the duty cycle of the pulse signal;

wherein the converter is implemented as a CMOS circuit.

* * * * *